April 21, 1964 R. A. NIEKAMP 3,129,804
STORE FIXTURE
Filed June 22, 1960 4 Sheets-Sheet 1

INVENTOR
RICHARD A. NIEKAMP
BY William R. Jacox
HIS ATTORNEY

April 21, 1964  R. A. NIEKAMP  3,129,804
STORE FIXTURE

Filed June 22, 1960  4 Sheets-Sheet 2

INVENTOR
RICHARD A. NIEKAMP
BY *William Jacox*
HIS ATTORNEY

April 21, 1964     R. A. NIEKAMP     3,129,804
STORE FIXTURE

Filed June 22, 1960     4 Sheets-Sheet 3

INVENTOR
RICHARD A. NIEKAMP
BY William N. Jacox
HIS ATTORNEY

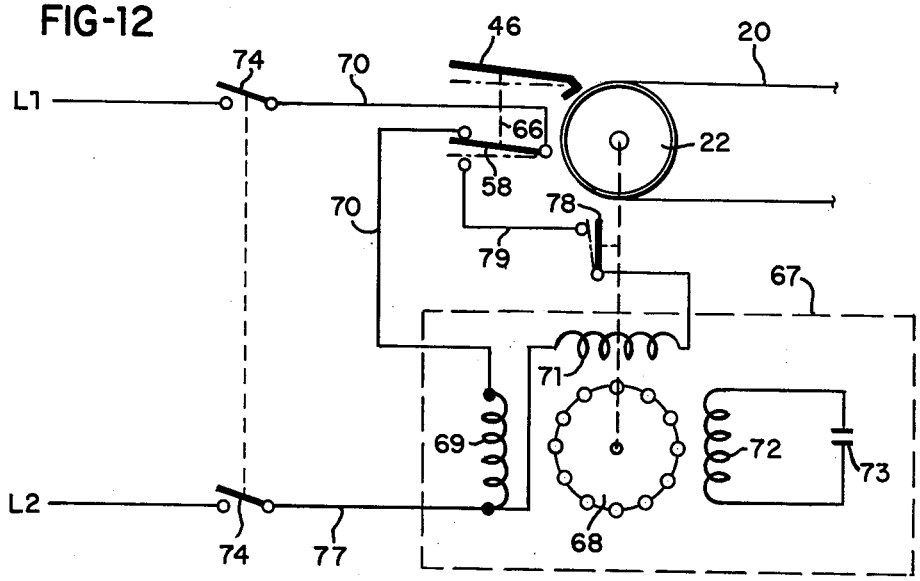

United States Patent Office 3,129,804
Patented Apr. 21, 1964

3,129,804
STORE FIXTURE
Richard A. Niekamp, Montgomery County, Ohio, assignor to Standard Dayton Corporation, Dayton, Ohio, a corporation of Ohio
Filed June 22, 1960, Ser. No. 37,932
11 Claims. (Cl. 198—37)

This invention relates to a store fixture. The invention relates more particularly to a store fixture of the type known as a check-out counter and particularly adapted for supermarket merchandising.

This application is a continuation-in-part of my copending application Serial No. 366,950, filed July 9, 1953, now abandoned.

In the field of retail merchandising known as supermarket merchandising, articles are selected by a customer and brought to a check-out counter at which a clerk is stationed. The clerk has a cash register upon which to record the price of the articles of merchandise. It is of course, important that the clerk record the price of each and every article of merchandise. Therefore, a check-out counter should have means which require that the check-out clerk manually engage each and every article of merchandise so that the clerk is cognizant of each item which passes to the customer.

Also, it is important that the check-out counter have means which permit the check-out clerk to check the merchandise with the least amount of effort.

In the supermarket type of retail merchandising numerous types of articles are available for purchase by a customer. The articles may vary from a rather heavy item such as a large bag of potatoes to a light article such as a toothbrush or magazine or the like. It is important that the check-out counter operate properly with any of the various types of items.

It is also important that such a check-out counter be one which may be operated in complete safety to both the operator and to customers or others who may come in contact with the check-out counter.

Thus, an object of this invention is to provide a check-out counter for retail merchandising in which articles of merchandise are carried rapidly to a location within reach of a check-out clerk and in which each of the articles is automatically stopped at such a location so that the clerk is required to manually engage each article of merchandise for recording the price thereof.

Another object of this invention is to provide control apparatus for a check-out counter which is extremely sensitive in indicating the presence of an article of merchandise, regardless of the weight or size or shape of the article.

Another object of this invention is to provide such control means which extends completely across a check-out counter and yet is equally sensitive at all portions thereof to indicate the presence of any type of article of merchandise.

Another object of this invention is to provide a check-out counter for retail merchandising in which the check-out clerk performs the duties of checking with the minimum amount of physical and mental effort.

Another object of this invention is to provide such a check-out counter which has safety features for the protection of the check-out clerk and customers and others who may come in contact with the check-out counter.

Another object of this invention is to provide a check-out counter assembly of the conveyor belt type in which the motor means which moves the conveyor belt is capable of rapidly stopping the movement of the conveyor belt.

Another object of this invention is to provide such check-out counter apparatus which operates without damage to merchandise or to packaging of the merchandise.

Other objects and advantages reside in the construction of parts, the combination thereof, the method of manufacture, and the mode of operation, as will become more apparent from the following description.

In the drawing:

FIGURE 12 is a schematic diagram of brake motor circuitry of this invention.

Figure 1:
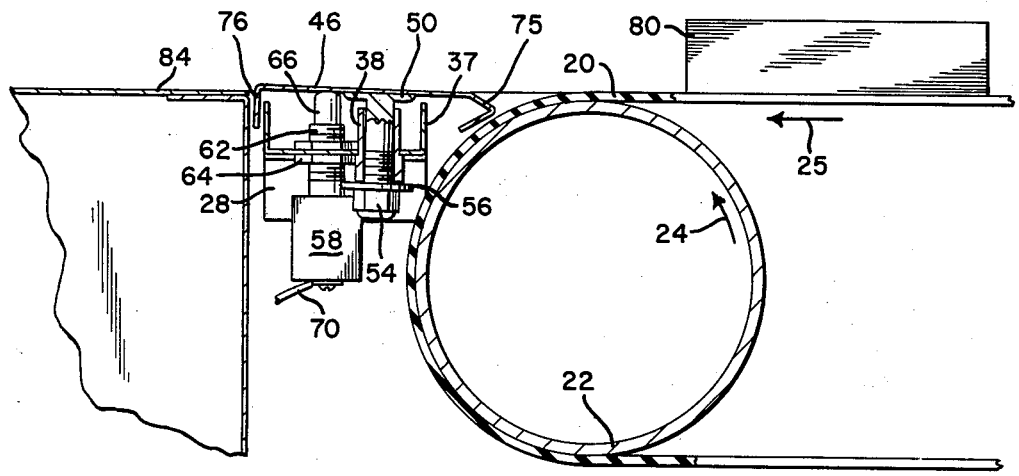
FIGURE 1 is a diagrammatic sectional view, with parts shown in elevation, disclosing a portion of a store fixture of this invention.

Referring to the drawings in detail, a store fixture of this invention comprises a conveyor belt 20 which is carried and moved by any suitable cylinder, drum or roller means 22. Preferably, motor means for operation of the belt 20 are connected to the cylinder 22 for rotation thereof. In accordance with this invention, the motor means for rotation of the drum or roller member 22 are preferably of a type known as "brake" motors which are capable of very rapid stopping. The motor means may be of the type disclosed in Patent Number 2,627,059, which is owned by the assignee of this application. However, any suitable means may be used for quickly stopping the belt 20.

The cylinder or drum 22 is rotated in the direction shown by an arrow 24 in FIGURE 1 so that the upper surface of the belt 20 moves to the left, as shown by an arrow 25 in FIGURE 1.

Figure 5:
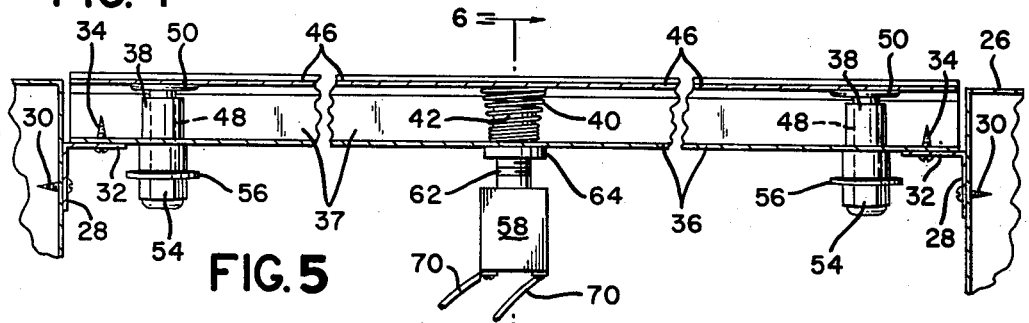
FIGURE 5 is an enlarged sectional view taken substantially on line 5—5 of FIGURE 4.
Figure 7:
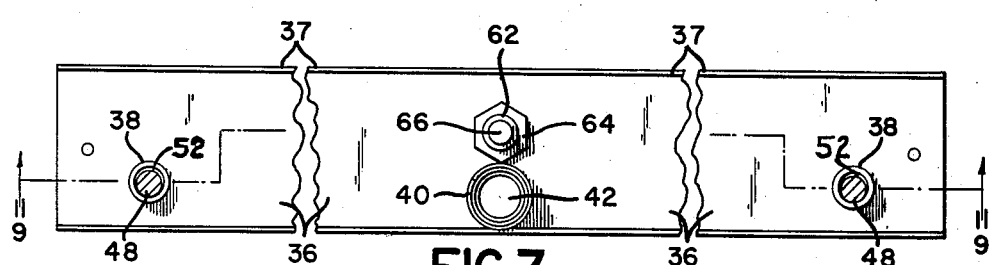
FIGURE 7 is a sectional view taken substantially on line 7—7 of FIGURE 6.
Figure 8:
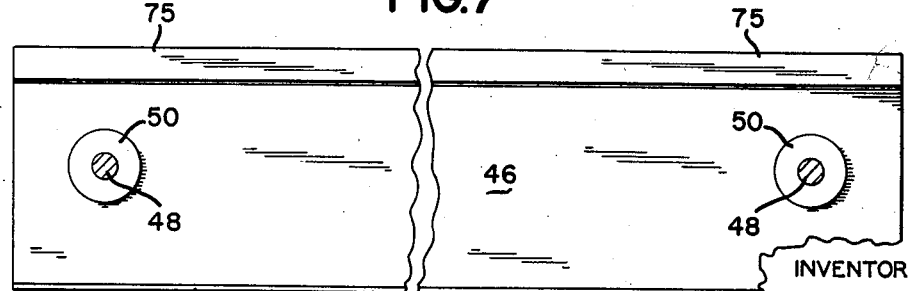
FIGURE 8 is a sectional view taken substantially on line 8—8 of FIGURE 6.
Figure 9:
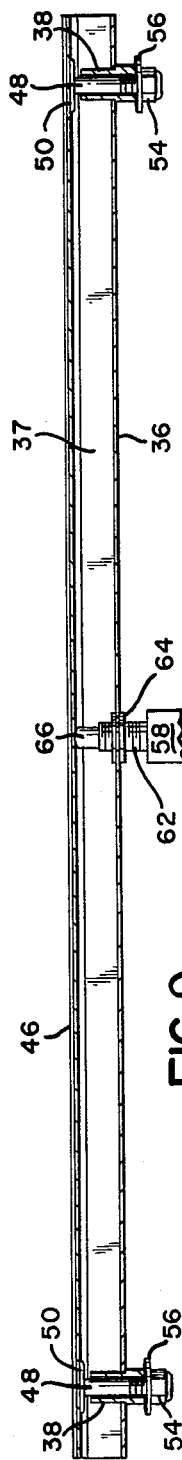
FIGURE 9 is a sectional view taken substantially on line 9—9 of FIGURE 7.

As shown in FIGURE 5, the store fixture has side members 26 to which are attached bracket members 28 by means of any suitable screws 30 or the like. The bracket members 28 are disposed adjacent the cylinder or drum 22 and each bracket 28 has a horizontal portion 32. Mounted upon the portions 32 and attached thereto by suitable means such as screws 34 is a substantially horizontal plate 36. The plate 36 may be provided with side flanges 37.

The plate 36 carries a plurality of spaced-apart tubular members or sleeves 38 each of which is secured in vertical position to the plate 36 and extends therethrough. The plate 36 supports any suitable resilient means, herein shown as a helical spring 40 which is carried by a boss or stud 42. The boss or stud 42, as shown in FIG-URE 6, is provided with threads so that, if desired, the spring 40 may be adjusted with respect to the stud 42.

Disposed above the plate 36 and above the spring 40 is a shelf or plate 46 which is urged upwardly by the spring 40 so that the spring 40 is in supporting relation to the shelf 46. Attached to the lower surface of the shelf 46 are a plurality of bolts 48 each of which has a head 50 which is secured to the shelf 46 by any suitable means such as by welding or the like. Each of the bolts 48 extends through one of the tubular members or sleeves 38 of the plate 36. Each sleeve 38 has an opening 52 which is somewhat larger than the diameter of the bolt 48 which extends therethrough so that the bolt 48 is angularly, as well as axially movable, within its respective sleeve 38. Thus, each sleeve 38 and its respective bolt 48 provide guide means in movement of the shelf 46.

Attached to the lower end of each bolt 48 is a nut 54. Preferably, each nut 54 is of the locking type so that it remains fixed in any adjusted position upon its respective bolt 48. Encompassing each bolt 48 and disposed between the nut 54 thereof and the sleeve 38 may be any suitable washer or spacer 56. The nuts 54 are used to adjust the normal position of the shelf 46 with respect to the plate 36, as the shelf 46 is engaged by the spring 40 and urged upwardly thereby.

Supported by the plate 36 is any suitable detector or indicator or control means, herein shown as being a switch 58 having a tube 62 extending through the plate 36 and clamped thereto by means of nut members 64. Reciprocally movable within the tube 62 is a plunger 66 which operates suitable contact members or the like (not shown) within the switch 58. Also, not shown within the tube 62 are resilient means which urge the plunger 66 upwardly against the plate 46. The switch 58 has leads or conductor members 70 connected thereto and extending therefrom and adapted to be electrically attached to any suitable control mechanism. Preferably, the leads 70 are connected to a control unit which energizes and deenergizes the motor means for operation of the drum or roller 22. Thus, when the plunger 66 is moved downwardly the control unit deenergizes the motor which rotates the drum 22, or the control unit deenergizes a running winding of the motor which rotates the drum 22. However, within the purview of this invention, any suitable means may be used for any purpose to detect or indicate movement of the shelf 46.

As shown in FIGURES 1, 2, 3, and 6, the plate or shelf 46 may be provided with a downwardly extending V-shaped forward edge 75 which is closely adjacent a portion of the belt 20 which is in engagement with the cylinder 22, as shown in FIGURE 1. The plate or shelf 46 may also be provided with a downwardly extending rear flange 76.

As shown in FIGURE 1, the plunger 66 in its engagement with the shelf 46 preferably urges the shelf 46 to be slightly inclined downwardly from the flange 76 toward the forward edge portion 75. However, such inclination of the shelf 46 is not necessary for the proper operation of the apparatus.

As stated above, the motor means may be of the brake type shown in Patent No. 2,627,059. FIGURE 12 shows a circuit in which such a brake type of motor is employed. A motor 67 is provided with a rotor 68 which is connected by any suitable means to the drum or roller 22 for rotation thereof.

The motor 67 is provided with a main running winding 69, an auxiliary winding 71, and a brake winding 72. The brake winding 72 is shown as being closed on itself through a capacitor 73.

Lines L1 and L2 serve as conductors for electrical energy. Circuit closer members 74 are connected in the lines L1 and L2. One of the leads 70, which extends from the switch 58, is connected to one of the circuit closer members 74. The other lead 70 extends from the switch 58 to one end of the main running winding 69. The other end of the running winding 69 is connected to a lead 77, which is joined to the other circuit closer member 74.

One end of the auxiliary winding 71 is connected to the lead 77. The other end of the auxiliary winding 71 is connected to any suitable switch means 78, which is closed when the rotor 68 is rotating and which is open when the rotor 68 is not rotating. A lead 79 connects the switch 78 to the switch 58.

*Operation*

Normally, during a check-out operation the cylinder 22 is continuously operated by the motor means in the direction of the arrow 24 shown in FIGURE 1 so that the upper surface of the conveyor belt 20 moves to the left, as shown in FIGURE 1. The conveyor belt 20 thus is normally moving in a direction to carry articles of merchandise to the shelf 46. The check-out clerk is positioned so that the shelf 46 can be readily manually reached by the check-out clerk.

Figure 2:
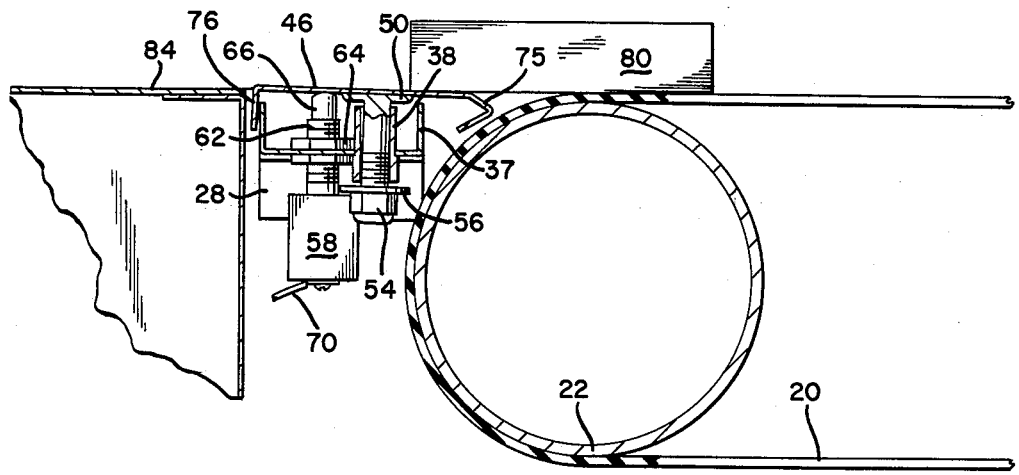
FIGURE 2 is a diagrammatic sectional view similar to FIGURE 1 showing the elements of the apparatus in a position of operation.

As shown in FIGURE 1, an article of merchandise such as a box 80 is moved by the conveyor belt 20 toward the shelf 46. The conveyor belt 20 moves the box 80 into engagement with the upper surface of the shelf 46, as shown in FIGURE 2, and forces the shelf downwardly. Movement of the shelf 46 downwardly forces the plunger 66 of the switch 58 downwardly. When the plunger 66 moves downwardly, the switch 58 is operated so that the control unit connected to the conductor members 70 deenergizes the motor means which is in driving relation to the cylinder 22. Thus, the cylinder 22 immediately stops when an article of merchandise such as the box 80 is disposed upon the shelf 46 as shown in FIGURE 2. Thus, the item of merchandise comes to rest with at least a portion thereof upon the shelf 46.

Then, the check-out clerk records the price of the item of merchandise which is in engagement with the shelf 46 and moves the item off of the shelf 46. The merchandise is moved onto another support member 84, herein shown in FIGURES 1, 2, and 3 as being a stationary shelf, or table or the like. However, the support member 84 may consist of another conveyor belt which moves merchandise in a direction from the shelf 46.

After the box 80 is moved off of the shelf 46, the shelf 46 moves upwardly to its normal position shown in FIGURE 1. Therefore, the switch 58 is again in its normal position so that the motor means again drives the drum or cylinder 22. Thus, another article of merchandise is moved by the belt 20 into engagement with the upper surface of the shelf 46.

Figure 3:
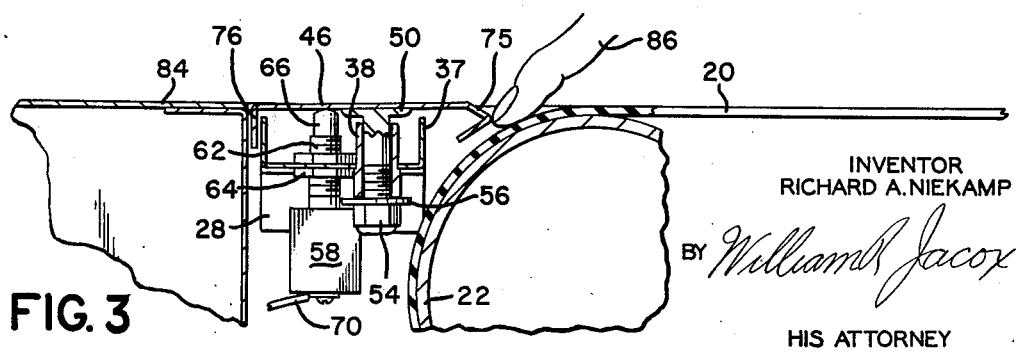
FIGURE 3 is a diagrammatic sectional view similar to FIGURES 1 and 2 showing elements of the assembly in another position of operation.
Figure 4:
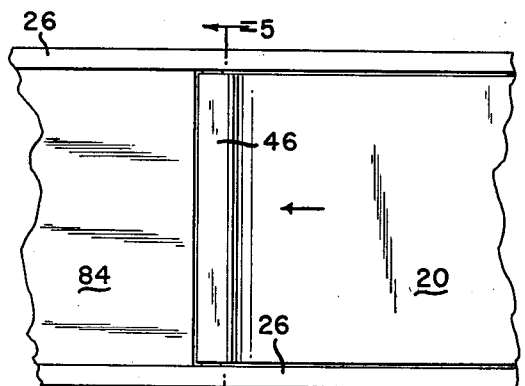
FIGURE 4 is a fragmentary top view, drawn on a smaller scale, showing a portion of a store fixture of this invention.
Figure 6:
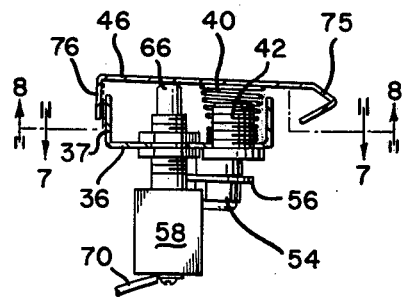
FIGURE 6 is a sectional view taken substantially on line 6—6 of FIGURE 5.

In movement of the conveyor belt 20 toward the shelf 46, there are occasions when a person's fingers may become engaged with the conveyor belt adjacent the shelf 46. When this occurs, a person's finger may be carried into engagement with the shelf 46, as shown in FIGURE 3. Herein the person's finger is referred to by reference numeral 86. When the finger 86 is carried by the belt 20 into engagement with the forward edge 75 of the shelf 46, the forward edge 75 of the shelf 46 is lifted, as shown in FIGURE 3. Thus, the shelf 46 pivotally moves so that the plunger 66 is forced downwardly, as shown in FIGURE 3, and the switch 58 is operated, deenergizing the motor means driving the drum 22. Due to the fact that the motor means driving the drum 22 is preferably of the brake type, the motor means quickly stops the drum 22 and prevents injury to the finger 86.

Also, if a magazine or other small article or any portion of a larger article of merchandise should be carried downwardly by the belt 20 to a position between the shelf 46 and the belt 20, rather than upon the shelf 46, the article or a portion thereof becomes positioned in a manner similar to that shown by the finger 86 in FIGURE 3. When this occurs, the shelf 46 is pivoted in the manner shown in FIGURE 3 or the shelf is pivoted in the manner shown in FIGURE 2. Thus, the switch 58 causes the motor means driving the cylinder 22 to become immediately deenergized so that the conveyor belt 20 quickly stops. Therefore, an article of merchandise or the packaging material therefor is not damaged if any portion thereof should become positioned between the edge 75 of the shelf 46 and the belt 20.

Figure 10:
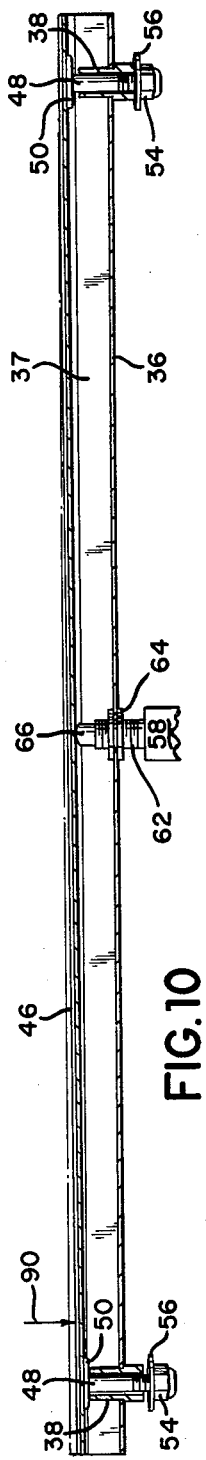
FIGURE 10 is a sectional view similar to FIGURE 9 showing elements of the assembly in a position of operation.
Figure 11:
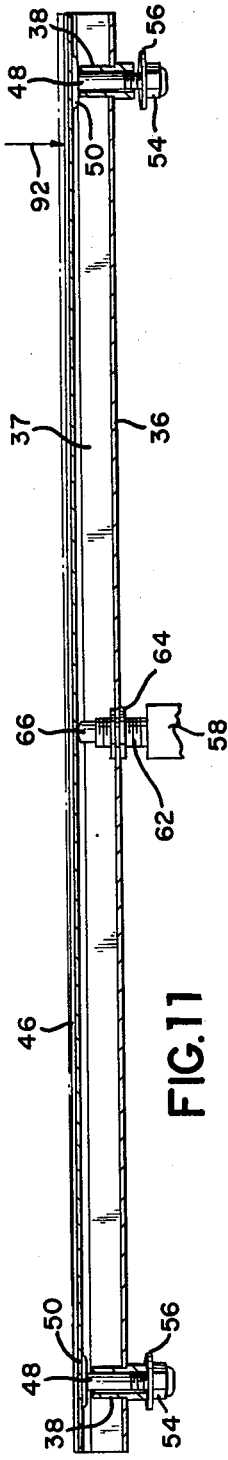
FIGURE 11 is a sectional view similar to FIGURES 9 and 10, showing elements of the assembly in another position of operation.

It is also to be understood that in the use of the checkout counter of this invention, articles of merchandise may be placed upon the conveyor belt 20 at any position across the width of the conveyor belt 20 between the side portions 26 and carried to the shelf 46. Due to the fact that the shelf 46 is freely pivotally movable, the plunger 66 is moved downwardly to deenergize the motor means when any article of merchandise comes into contact with any portion of the shelf 46. For example, as shown in FIGURE 10, if an article of merchandise should become positioned at the left hand portion of the shelf 46, pressure is applied as shown by an arrow 90 in FIGURE 10. The left hand portion of the shelf 46 moves downwardly, tilting the shelf 46 and forcing the plunger 66 downwardly. Furthermore, as shown in FIGURE 11, if an article of merchandise engages the shelf 46 at the right hand portion thereof, weight or pressure is applied as shown by an arrow 92 in FIGURE 11, and the shelf 46 tilts downwardly from the left hand portion thereof to the right hand portion thereof and the plunger 66 is forced downwardly, causing deenergization of the motor means.

Thus, it is understood that if an article of merchandise comes into engagement with any portion of the shelf 46, the shelf 46 moves downwardly or tilts or pivotally moves so that the plunger 66 is forced downwardly causing deenergization of the motor means which drives the cylinder 22. Thus, it is understood that the shelf 46 is movable downwardly while also being pivotally movable, within limits, about a plurality of axes. In fact, the shelf 46 may tilt or pivotally move about any axis. This makes possible extremely accurate, sensitive, quickly responsive detector means for indicating that an article of merchandise is in engagement with the shelf 46 at any portion thereof.

Such detector means is also important in regard to safety in operation of the invention due to the fact that if a person comes into contact with any portion of the pivotal shelf 46, the plunger 66 is instantly moved downwardly, immediately stopping the motor means and immediately stopping the conveyor belt 20.

When the brake motor circuitry of FIGURE 12 is employed, the operation of the apparatus is as follows: The circuit closer members 74 are normally closed so that the running winding 69 of the motor 67 is normally energized through the switch 58. Thus, the rotor 68 is rotating and driving the roll or drum 22 for movement of the belt 20.

If, for any reason, as discussed above, the shelf 46 is moved causing the plunger 66 to be moved downwardly, the switch 58 is operated to its dotted position. Thus, the running winding 69 is deenergized and the auxiliary winding 71 is energized. Due to the fact that the rotor 68 is rotating, energization of the auxiliary winding 71 causes energization of the brake winding 72 which is closed on itself. Thus, considerable current is generated in the brake winding 72 and the rotor 68 is brought to an abrupt stop. Thus, the roll or drum 22 is brought to an abrupt stop. There is no coasting of the drum 22. Ordinarily, such braking action results in stopping of the drum 22 so quickly that the belt 20 does not move after the plunger 66 is depressed.

Therefore, no damage can occur to a person's fingers which may engage the belt 20 and the plate 46. Also, no damage can occur to an item of merchandise which may become positioned between the belt 20 and the plate 46.

Thus it is understood, that this invention provides means by which any article of merchandise is readily carried to the position of a check-out clerk and the article of merchandise is automatically stopped at the position of the check-out clerk. The check-out counter operates without damage to an article of merchandise or to the packaging material of the merchandise. Furthermore, the apparatus of this invention provides means by which a check-out clerk is required to manually engage each article of merchandise in order to assure accurate checking of the merchandise. However, the check-out clerk does not need to lift any article of merchandise. Thus, the physical and mental effort required by the check-out clerk is reduced to a minimum. Also, the apparatus of this invention provides complete safety to all personnel including the check-out clerk, customers and others who may come into engagement with the apparatus.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A conveyor assembly of the type having support structure, a rotatable support roller carried by the support structure, and a belt movable upon the roller with rotation thereof, comprising a shelf disposed adjacent the roller and the belt, the shelf having a pair of opposed edges, resilient means carried by the support structure in supporting relation to the shelf at the central portion thereof, guide means attached to the shelf in spaced relation from said edges thereof, guide means attached to the support structure, there being loose connection between said guide means, there thus being limited up and down movement of said edges of the shelf with respect to the support structure and limited pivotal movement of the shelf about any axis, and control means engaging the shelf for operation with movement of the shelf.

2. In check-out apparatus for retail merchandising, a support cylinder, a conveyor belt movably carried by the cylinder, a shelf disposed adjacent the cylinder so that the belt is between the cylinder and the shelf, the shelf having an edge portion closely adjacent the belt, support structure below the shelf, spring means disposed between the support structure and the shelf and in supporting relation to the shelf, the spring means being in engagement with a central portion of the shelf, a plurality of tubular members carried by the support structure and substantially normal to the shelf, a plurality of pin members, the pin members being attached to the shelf substantially normal thereto, there being one pin member extending through each of the tubular members, each tubular member having a passage somewhat larger than the pin member which extends therethrough so that there is possible lateral movement of each pin member in its respective tubular member, each pin member having an end portion extending below its respective tubular member, abutment means attached to said end portion of each pin member and preventing passage of said end portion through said tubular member but permitting axial movement of said pin member within said tubular member, and a switch member adjacent the shelf and operable thereby so that the switch member operates with movement of the shelf member.

3. Conveyor apparatus provided with a conveyor belt movable upon a rotatable support roller, the belt having an upper surface, comprising shelf structure having a portion thereof in substantial alignment with the upper surface of the belt, the shelf structure having a forward edge adjacent the belt and an opposed rearward edge, the shelf structure also having a central portion, support structure adjacent the shelf structure, resilient means carried by the support structure and in engagement with the shelf structure at the central portion thereof, the resilient means urging upward movement of the shelf structure, limit means carried by the shelf structure at positions spaced from said edges thereof, limit means carried by the support structure, the limit means of one structure loosely encompassing the limit means which is carried by the other structure, abutment means carried by one of said limit means and engageable with the other limit means, there thus being limited relative movement between said limit means, there thus being limited relative movement between the shelf structure and the support structure, said edges of the shelf structure thus being freely movable up and down with respect to the support structure while the shelf structure is also freely pivotal about any axis, and control means engageable by the shelf structure and operable thereby to indicate movement of the shelf structure with respect to the support structure.

4. In a conveyor assembly, rotatable cylinder means, a belt supported by the cylinder means and movable thereupon, a shelf disposed adjacent the belt and the cylinder means, support means adjacent the shelf, resilient means carried by the support structure and in supporting relation to the shelf so that the shelf is movable toward and away from the support structure while being pivotally movable about a plurality of axes, guide means carried by the support structure, a plurality of spaced-apart pin members attached to the shelf and loosely disposed within said guide means and limiting pivotal movement of said shelf, and control means engageable by the shelf, and operable thereby for indicating movement of the shelf.

5. A check-out counter for retail merchandising comprising support structure, a conveyor belt, a rotatable cylinder supporting the belt, motor means in driving relation to the cylinder, the motor means being capable of very rapid stopping, a substantially horizontal shelf disposed adjacent the cylinder, bias means supporting the shelf adjacent the central portion thereof, guide means carried by the shelf and by the support structure, there being loose connection between said guide means so that the shelf is movable upwardly and downwardly while also being pivotally movable about any axis, the shelf having front and rear portions which are movable upwardly and downwardly, switch means in electrical connection with the motor means and engageable by the shelf.

6. Check-out counter apparatus for retail merchandising comprising a rotatable cylinder, a conveyor belt supported by the cylinder and movable thereby, a shelf disposed adjacent the cylinder and adjacent the belt, the shelf having a forward edge portion and a rearward edge portion, support structure disposed below the shelf, guide pin means attached to the shelf at positions spaced from the forward and rearward edge portions thereof, the guide means loosely extending through the support structure permitting pivotal movement of the shelf, the guide pin means also permitting movement of said edge portions toward and away from the support structure, fastening means attached to the pin means and limiting movement of the shelf in a direction from the support structure, resilient means carried by the support structure and engaging the shelf at the central portion thereof and urging movement of the shelf in a direction from the support structure, the shelf thus being pivotal about any axis, and means engageable by the shelf and operable thereby upon movement of the shelf.

7. Check-out apparatus for retail merchandising comprising support structure, a movable conveyor belt having a substantially horizontal surface, shelf structure having an edge portion closely adjacent and slightly above the surface of the conveyor belt, resilient means carried by the support structure in engagement with the shelf structure and freely supporting the shelf structure at the central portion thereof so that the shelf structure is pivotally movable about any axis, the shelf structure being pivotal as said edge portion thereof is moved downwardly toward said belt, the shelf structure being pivotal as said edge portion thereof is moved upwardly away from said belt, the shelf structure also being tiltingly movable to inclined positions in which the edge portion thereof is angular with respect to said surface of the conveyor belt, the shelf structure also being movable upwardly and downwardly, abutment means carried by the support structure and engageable by the shelf structure limiting up and down movement of the shelf structure, and switch means operable by movement of said shelf structure.

8. A store fixture comprising conveyor means, rigid movable support means adjacent the conveyor means for receiving articles carried thereto by the conveyor means, the rigid movable support means having a peripheral edge, stationary support structure disposed below the movable support means, resilient means carried by the support structure and in supporting relation to the movable support means at the central portion thereof, complementary cooperating guide means carried by the rigid movable support means and by the stationary support structure, the guide means being spaced from the peripheral edge of the movable support means and being spaced from the resilient means, there thus being limited pivotal movement of the movable support means about any axis thereof and limited movement of the movable support means toward and away from the support structure as the movable support means is supported by the resilient means, and indicator means operable by the movable support means and indicating movement of said movable support means.

9. A store fixture comprising a conveyor member, a shelf disposed adjacent the conveyor member and adapted to receive articles therefrom, the shelf having a forward edge portion and a rearward edge portion, support structure disposed below the shelf, sleeve means carried by the support structure at positions spaced from said edge portions, pin means carried by the shelf and extending into the sleeve means, bias means at the central portion of the shelf urging the shelf in a direction from the support structure, the sleeve means and the pin means limiting movement of the shelf so that there is limited movement of the shelf toward and away from the support structure and so that there is limited movement of said shelf about any axis, and means indicating any such limited movement of said shelf.

10. A store fixture for retail merchandising comprising a shelf provided with a forward edge and a rearward edge, support structure disposed below the shelf, a plurality of sleeve members carried by the support structure, each of the sleeve members having a passage therethrough which is substantially vertical, a plurality of laterally aligned bolt members attached to the shelf at positions substantially equally spaced from said edges thereof, each bolt member extending through one of the sleeve members, a plurality of nut members, there being one nut member attached to each bolt member below the sleeve member, each nut member preventing withdrawal of its respective bolt member from the sleeve member through which the bolt member extends, each nut member being so attached to its respective bolt member that the bolt member is axially movable within its respective sleeve member, bias means engaging the shelf at the central portion thereof and urging upward movement of the shelf, such upward movement of the shelf being limited by the position of said nut members upon said bolt members, the shelf thus being pivotally movable about any axis while said edges of the shelf are movable upwardly and downwardly, and means adjacent the shelf and engageable thereby indicating movement of said shelf.

11. Conveyor control apparatus comprising shelf structure, support structure disposed adjacent the shelf structure, bias means carried by the support structure and engaging the shelf structure and urging upward movement of the shelf structure, the shelf structure including a protuberant portion, limit means carried by the support structure engageable with the protuberant portion of the shelf structure, the limit means limiting upward movement of the shelf structure, the limit means being in closely spaced relationship with respect to the protuberant portion of the shelf structure so that there is limited pivotal movement of the shelf structure and so that there is limited downward movement of the shelf structure, there being limited inclined movement of the shelf structure as a result of the spacing between the limit means and the protuberant portion of the shelf structure, and means indicating movement of the shelf structure.

References Cited in the file of this patent

UNITED STATES PATENTS

| | | |
|---|---|---|
| 1,355,488 | McKenney | Oct. 12, 1920 |
| 1,965,302 | Wagner | July 3, 1934 |
| 2,109,210 | Dunlop | Feb. 22, 1938 |
| 2,723,728 | Crawford | Nov. 15, 1955 |
| 2,859,395 | Martin et al. | Nov. 4, 1958 |
| 2,862,599 | Sinden | Dec. 2, 1958 |